US011164377B2

United States Patent
Sipolins et al.

(10) Patent No.: US 11,164,377 B2
(45) Date of Patent: Nov. 2, 2021

(54) MOTION-CONTROLLED PORTALS IN VIRTUAL REALITY

(71) Applicant: International Business Machines Corporation, Armonk, NY (US)

(72) Inventors: Aldis Sipolins, New York City, NY (US); Lawrence A. Clevenger, Saratoga Springs, NY (US); Benjamin D. Briggs, Waterford, NY (US); Michael Rizzolo, Albany, NY (US); Christopher J. Penny, Saratoga Springs, NY (US); Patrick Watson, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 15/982,710

(22) Filed: May 17, 2018

(65) Prior Publication Data
US 2019/0355175 A1    Nov. 21, 2019

(51) Int. Cl.
| | |
|---|---|
| G06F 3/048 | (2013.01) |
| G06T 19/00 | (2011.01) |
| G06F 3/0481 | (2013.01) |
| A63F 13/245 | (2014.01) |
| A63F 13/211 | (2014.01) |

(52) U.S. Cl.
CPC .......... *G06T 19/003* (2013.01); *A63F 13/211* (2014.09); *A63F 13/245* (2014.09); *G06F 3/04815* (2013.01); *A63F 2300/8082* (2013.01)

(58) Field of Classification Search
None
See application file for complete search history.

(56) References Cited

U.S. PATENT DOCUMENTS

| | | |
|---|---|---|
| 2010/0070859 A1 | 3/2010 | Shuster et al. |
| 2013/0050258 A1* | 2/2013 | Liu ............ G02B 27/017 |
| | | 345/633 |

(Continued)

OTHER PUBLICATIONS

Odom, "Video: HoleLenz Adds Magic Windows to HoloLens & Gives Portals to New Worlds « HoloLens: Next Reality." https://hololens.reality.news/news/video-holelenz-adds-magic-windows-hololens-gives-portals-new-worlds-0176281/ Feb. 26, 2017 [Accessed Feb. 20, 2018], 2 pages.

(Continued)

*Primary Examiner* — Thanh T Vu
(74) *Attorney, Agent, or Firm* — Scully, Scott, Murphy & Presser, P.C.; Daniel P. Morris

(57) ABSTRACT

Methods and systems of navigating within a virtual environment are described. In an example, a processor may generate a portal that includes a set of portal boundaries. The processor may display the portal within a first scene of the virtual environment being displayed on a device. The processor may display a second scene of the virtual environment within the portal boundaries. The processor may receive sensor data indicating a movement of a motion controller. The processor may reposition the portal and the second scene in the first scene based on the sensor data, wherein the first scene remains stationary on the device during the reposition of the portal and the second scene. The processor may translate a location of the portal within the first scene to move the portal towards a user of the device until the second scene replaces the first scene being displayed on the device.

18 Claims, 5 Drawing Sheets

(56) References Cited

U.S. PATENT DOCUMENTS

| | | | |
|---|---|---|---|
| 2015/0234547 A1 | 8/2015 | Barnett et al. | |
| 2017/0221264 A1* | 8/2017 | Perry | G06F 3/011 |
| 2017/0228931 A1* | 8/2017 | Parker | G06T 19/006 |
| 2018/0284885 A1* | 10/2018 | Kim | H04N 13/344 |
| 2019/0213793 A1* | 7/2019 | Balan | G02B 27/017 |

OTHER PUBLICATIONS

Hickey et al., "User experience study of concurrent virtual environments with 2D tab and 3D portal UIs," 2013 International Conference on Engineering, Technology and Innovation (ICE) & IEEE International Technology Management Conference, The Hague, Jun. 24-26, 2013, pp. 1-12.

Kotziampasis et al., "Seamlessly integrated distributed shared virtual environments." In Proceedings of the 20th Spring Conference on Computer Graphics (SCCG '04), Budmerice, Slovakia, Apr. 22-24, 2004; ACM, New York, NY, USA, 1pp. 138-147.

Pakanen et al., "Visual Indication while Sharing Items from a Private 3D Portal Room UI to Public Virtual Environments." In: Kotze P., Marsden G., Lindgaard G., Wesson J., Winckler M. (eds) Human-Computer Interaction—INTERACT 2013. INTERACT 2013., 14th IFIP TC 13 International Conference, Cape Town, South Africa, Sep. 2-6, 2013; Lecture Notes in Computer Science, vol. 8120. Springer, Berlin, Heidelberg, 2013, pp. 737-744.

Freitag et al., "Reorientation in virtual environments using interactive portals," 2014 IEEE Symposium on 3D User Interfaces (3DUI), Minneapolis, MN, Mar. 29-30, 2014, pp. 119-122.

\* cited by examiner

MOTION-CONTROLLED PORTALS IN VIRTUAL REALITY

FIELD

The present application relates generally to computers, and computer applications, and more particularly to computer-implemented methods and systems relating to virtual reality devices and applications.

BACKGROUND

A virtual reality console may generate a virtual environment by rendering stereoscopic images from three-dimensional models or structures. The virtual environment may be displayed on a virtual reality display device, such as a head-mounted display device, and may be viewed by a user using the virtual reality display device. The user may use toggle mechanisms on a controller, such as joysticks or buttons, to input navigation instructions in order to visually navigate the virtual environment being displayed by the virtual reality display device. However, by using the toggle mechanisms, the user remains stationary during the movements within the virtual environment, which causes a discrepancy between a visual acceleration experienced by the eyes of the user and the vestibular acceleration experienced by the inner ear of the user. As such, the discrepancy may cause the user to experience motion sickness when navigating the virtual environment.

SUMMARY

In some examples, a computer-implemented method of navigating within a virtual environment is generally described. The computer-implemented method may include generating, by a processor, a portal that includes a set of portal boundaries. The computer-implemented method may further include displaying, by the processor, the portal within a first scene of the virtual environment being displayed on a device. The computer-implemented method may further include displaying, by the processor, a second scene of the virtual environment within the portal boundaries. The computer-implemented method may further include receiving, by the processor, sensor data that indicates a movement of a motion controller configured to be in communication with the processor. The computer-implemented method may further include repositioning, by the processor, the portal and the second scene in the first scene based on the sensor data. The first scene may remain stationary on the device during the reposition of the portal and the second scene.

In some examples, a system effective to facilitate navigation within a virtual environment is generally described. The system may include a memory configured to store a set of instructions. The system may further include a motion controller. The system may further include a sensor configured to detect motions related to the motion controller. The system may further include a device configured to display images. The system may further include a processor configured to be in communication with the memory, the sensor, and the device. The processor may be configured to generate a portal that includes a set of portal boundaries. The processor may be further configured to display the portal within a first scene of the virtual environment being displayed on the device. The processor may be further configured to display a second scene of the virtual environment within the portal boundaries on the device. The processor may be further configured to receive sensor data from the sensor, wherein the sensor data indicates a movement of a motion controller. The processor may be further configured to reposition the portal and the second scene in the first scene based on the sensor data. The first scene may remain stationary on the device during the reposition of the portal and the second scene.

In some examples, a computer program product of navigating within a virtual environment is generally described. The computer program product may include a computer readable storage medium having program instructions embodied therewith. The program instructions may be executable by a processor to cause the processor to perform one or more methods described herein.

Further features as well as the structure and operation of various embodiments are described in detail below with reference to the accompanying drawings. In the drawings, like reference numbers indicate identical or functionally similar elements.

DETAILED DESCRIPTION

Figure 1:
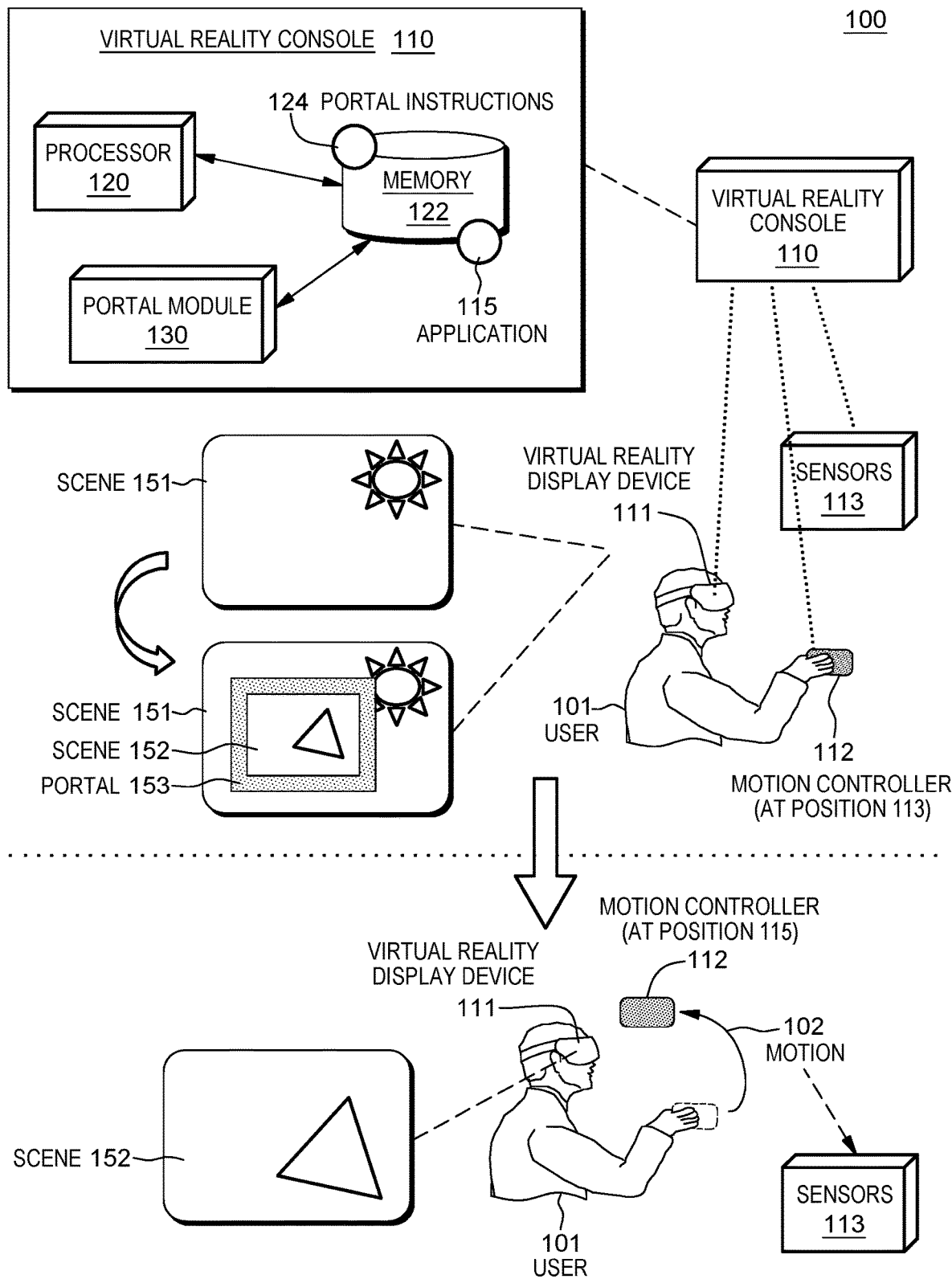
FIG. 1 illustrates an example computer system in one embodiment that can be utilized to implement motion-controlled portals in virtual reality in one embodiment of the present disclosure.

In some examples, a user may navigate a virtual environment by using a controller that includes buttons, which may cause motion sickness as mentioned above. In an example, a user may participate in a virtual reality rollercoaster using a virtual reality device, but the user may remain stationary in a chair, such that the eyes of the user may visually perceive movements resulting from the virtual roller coaster but the inner ear of the user detects that the user is stationery, thus causing motion sickness, which may be referred to as the locomotion problem, or virtual reality sickness.

In some examples, a teleporting approach (or "blinking method") may be implemented to mitigate the locomotion problem, but detracts from user immersion. In other examples, a screen may fade to black during scene transitions, but interferes with user immersion as well.

A system in accordance with the present disclosure (e.g., a system 100 shown in FIG. 1) may improve virtual reality systems by providing a practical application to address the locomotion problem experienced by users of virtual reality systems without interference with user immersion. A user of the system 100 may use a motion controller, such as by performing a motion with the motion controller, to control a portal within the virtual environment. The portal within the virtual environment may be a window within the virtual environment that allows the user to preview, or look into, a new scene that may be displayed by a virtual reality display device. The portal within the virtual environment may also allow the user to enter the new scene in response to the motion performed by the user with the motion controller. For example, the user may hold the motion controller and move the motion controller from one physical position to another physical position in order to move the portal within the virtual environment. By giving user control over the portal, the user may control movements of the portal, and may bring the new scene shown within the portal towards the eyes of the user within the virtual environment. By bringing the new scene towards the eyes of the user, the user may visually perceive movement of an object (e.g., the portal with the new scene) moving towards the user, instead of visually perceiving movements of the user. Further, by bringing the new scene towards the eyes of the user, the scene that the user is currently viewing may remain stationary, such that the user may not visually perceive movement of virtual objects in the current scene. Hence, the problems with conflicting motion cues may be mitigated because the user is not visually perceiving movements of the user, or movements of virtual objects surrounding the user, which would agree with the detection of the user being stationary sensed by the vestibular system of the user.

Further, conventional systems have used the concept of a static portal within virtual environments, and the static portal is typically implemented as parts of virtual reality applications that may be installed or executed on a virtual reality console. For example, various virtual reality games may include static portals for users to preview and select virtual objects or scenes. However, the static portals are typically stationary and the user has no control over movements of the static portals. The system 100 may implement a portal as a part of a core user interface of the virtual reality console. As such, any virtual reality application being executed on the virtual reality console may utilize the same portal provided by the system 100. Further, users of the system 100 may look through the portal to preview objects in the new scene shown within the portal, and may move the motion controller to virtually obtain virtual objects in the new scene through the portal. The users of the system 100 may also remove the portal from the virtual environment by perform particular motions with the motion controller.

FIG. 1 illustrates the example computer system 100 that can be utilized to implement motion-controlled portals in virtual reality, arranged in accordance with at least some embodiments described herein. In some examples, the system 100 may be implemented with a virtual reality console 110, a virtual reality display device 111, a motion controller 112, and/or one or more sensors 113. The virtual reality console 110 may be a virtual reality video game console, a simulator, and/or other console that may run virtual reality applications. The virtual reality display device 111 may be a virtual reality head-mounted display that may include a display, lenses, sensors (such as gyroscopes, accelerometers, magnetometers), eye tracking sensors, head tracking sensors, cameras, projectors, and/or other components. The virtual reality display device 111 may be configured to display stereoscopic images rendered by the virtual reality console 110. The motion controller 112 may be a controller including buttons, joysticks, gyroscopes, accelerometers, and/or other components. A user 101 may use the motion controller 112 to generate commands relating to a virtual reality application being executed by the virtual reality console 110. The sensors 113 may include motion detectors, infrared sensors, cameras, and/or other types of sensors. The sensors 113 may be configured to detect movements, signals, lights, and/or other physical movements within a physical environment surrounding the user 101, and may transmit the detected information to the virtual reality console 110. The virtual reality console 110, the virtual reality display device 111, the motion controller 112, and the sensors 113 may be configured to be in communication with each other directly or wirelessly.

The virtual reality console 110 may include a processor 120, a memory 122, and/or a portal module 130. The processor 120, the memory 122, and the portal module 130 may be configured to be in communication with each other. In some examples, the processor 120 may be a central processing unit of the virtual reality console 110. The processor 120 may include a graphics processing unit configured to implement graphics processing instructions, such as instructions relating to computer graphics rendering and/or rasterization techniques. In some examples, the processor 120 may be configured to control operations of the memory 122 and the portal module 130. In some examples, the portal module 130 may be a piece of hardware component such as programmable logic devices, microcontrollers, memory devices, and/or other hardware components, of the processor 120. In some examples, the portal module 130 may be a software module that may be implemented with the processor 120 to perform one or more tasks.

The memory 122 may be configured to selectively store instructions executable by the processor 120 and the portal module 130. For example, in one embodiment, the memory 122 may store a set of portal instructions 124, where the portal instructions 124 may include instructions, such as executable code, related to graphics processing algorithms, motion detection techniques, matrix transformations, gesture recognition algorithms, and/or other algorithms related to virtual reality and/or augmented reality applications. The processor 120 and the portal module 130 may each be configured to execute one or more portions of the portal instructions 124 in order to facilitate implementation of the system 100.

In some examples, the virtual reality console 110 may include additional components, such as graphics processing units, sensors, network cards, audio processing components, and/or other components that may facilitate execution of an application 115, where the application 115 may be a virtual reality application. In some examples, program instructions, such as executable code, of the application 115 may be stored in memory 122.

In some examples, the portal module 130 may be a piece of hardware configured to implement a virtual reality game engine associated with the virtual device console 110, or may be a software module that may be a part of a virtual reality game engine associated with the virtual device console 110. In some examples, a virtual reality game engine may be a software development environment designed for users to build virtual reality objects and applications that may be integrated into the core user interface of the virtual reality console 110. In some examples, the portal module 130 may include components configured to create and process virtual objects within a virtual reality environment.

In an example shown in FIG. 1, an execution of the application 115 by virtual reality console 110 may cause processor 120 to render a scene 151, where the scene 151 may be a stereoscopic image of a three-dimensional model associated with the application 115. The virtual reality console 110 may send image data representative of the scene 151 to the virtual reality display device 111, such that the scene 151 may be displayed by the virtual reality display device 111. In an example, the application 115 may be a video game and the scene 151 may be a room within the video game. The user 101 may view the scene 151 on the virtual reality display device 111, and may use the motion controller 112 to perform various commands associated with the application 115. For example, the user 101 may use directional buttons on the motion controller 112 to navigate within the scene 151. In some examples, the user 101 may use the motion controller 112 to control movements of one or more virtual objects, or to reposition the virtual objects, being displayed by the virtual reality display device 111.

In an example, when the user is viewing the scene 151 on the virtual reality display device 111, the user may request a transition to a new scene, such as a scene 152. In the example where the application 115 may be a video game, a new scene may be another room. The processor 120 may be further configured to render the scene 152, where the scene 152 may be a stereoscopic image of a three-dimensional model associated with the application 115. In response to the request to transition to a new scene, the portal module 130 may generate a portal 132, where the portal 132 may be a virtual object that can be displayed to overlay at least one portions of a scene being currently displayed on the virtual reality display device 111. In some examples, the portal module 130 may generate more than one portal, depending on a desired implementation of the system 100. Generation of the portal 132 may include defining a set of portal boundaries, where the portal boundaries may define a shape and a size of the portal 132.

In some examples, the shape and the dimensions of the portal boundaries may be defined in the portal instructions 124. In some examples, the shape and the dimensions of the portal boundaries may be based on the application 115. For example, the portal module 130 may generate a first portal of a first shape and a first size for a first virtual reality game, and may generate a second portal of a second shape and a second size for a second virtual reality game. In some examples, the use 101 may request the portal 132 to be of a particular size. In some examples, the size of the portal boundaries may be smaller than a size of the screen of the virtual reality display device 111, such that the portal 132 may be displayed within the screen of the virtual reality display device 111. In some examples, the shapes and dimensions of the portal 132 may be based on a number of portals generated by the portal module 130 and/or displayed on the screen of the virtual reality display device 111.

The portal module 130 may send the dimensions of the portal boundaries to the processor 120. The processor 120 may render the scene 152 based on the dimensions of the portal boundaries in order to shape and size the scene 152 to fit within the portal boundaries.

In an example, the portal instructions 124 may include scripts that may be executed by the portal module 130. For example, the portal instructions 124 may include a portal camera script to define a portal camera within the virtual environment. The portal instructions 124 may further include scripts to generate a virtual object, such as a window or a skybox, that defines the portal 132. The portal instructions 124 may further include scripts to render stereoscopic images to the correct cameras within the virtual environment, in order for the user 101 to view desired dimensions through the portal 132. The portal instructions 124 may further include scripts to instruct cameras within the virtual environment to render only layers and/or dimensions specified by the user 101 and/or the portal instructions 124. For example, virtual objects of the first scene 151 may be tagged with an identification of a first layer (or the first scene 151), and virtual objects of the second scene 152 may be tagged with an identification of a second layer (or the second scene 152). If a user specifies the first layer, the virtual reality console 110 may populate a current scene (e.g., the first scene 151) with the virtual objects tagged with the identification of the first layer, but not the second set of virtual objects. In another example, in order to display the second scene 152 and its virtual objects within the portal 132, the user 101 may specify the second layer to be displayed within the portal 132. The virtual reality console 110 may render the second scene 152 and virtual objects tagged with the identification of the second layer within the portal boundaries of the portal 132.

The portal instructions 124 may further include scripts to disable collisions between dimensions or scenes, such that virtual objects in different dimensions, or scenes, may exist in a same location within the virtual environment. For example, the portal 132 may be overlaid on a virtual object of the scene 151, such that the virtual object may not be visible in the scene 151 but the image data representing the virtual object remains unchanged. In another example, the portal instructions 124 may include a plane script that may be executed to detect collisions, to switch dimensions of scenes, and to ensure rendering of the correct dimensions of a scene within the portal 132. The plane script may also provide a trigger to determine a distance between the eyes of the user 101 to the portal, and to determine a time to switch between dimensions of the virtual environment. The plane script may also be executed to perform mesh deformation in response to the distance trigger, such that clipping issues may be mitigated when the portal 132 is too close to the eyes of the user 101. The portal instructions 124 may further include a render script to instruct the portal camera to render its view to a texture twice to produce a stereoscopic image. In an example, the first rendering may result in a first image for the left eye of the user 101, then the render script may perform matrix transformations on the first image to render a second image for the right eye of the user 101.

Upon generating the portal 132 and rendering the scene 152, the virtual reality console 110 may send image data representative of the portal 132 and the scene 152 to the virtual reality display device 111. The virtual reality console 110 may further send instructions relating a location to display the portal 132 and the scene 152 on the virtual reality display device 111. For example, the virtual reality console 110 may define a set of coordinates among a screen of the virtual reality display device 111 to display the portal 132, and may include an instruction to display the scene 152 within the portal boundaries of the portal 132.

In an example, by displaying the scene 152 within the portal boundaries of the portal 132, the user 101 may view a stereoscopic image of the scene 151 from the screen of the virtual reality display device 111, and may also view another stereoscopic image of the scene 152 through the portal 132. In other words, the scene 152 viewed by the user 101 through the portal 132 resembles a view of the scene 152 from a screen of a virtual reality display device.

The virtual reality display device 111 may display the portal 132 and the scene 152 to overlay a portion of the scene 151, as shown in the example in FIG. 1. When the portal 132 is displayed by the virtual reality display device 111, the user 101 may move the motion controller 112 to reposition, or to move, the displayed portal 132. In some examples, the user 101 may use the buttons of the motion controller 112 to move the portal 132. As the portal 132 moves on the screen of the virtual reality display device 111, the scene 152 displayed within the portal boundaries of the portal 132 may move with the portal 132. In an example, the movement of the scene 152 in accordance with the portal 132 may be based on the portal instructions 124. For example, if the portal 132 moves towards the eyes of the user 101, the scene 152 may also move towards the eyes of the user 101. Similarly, if the portal 132 moves away from the eyes of the user 101, the scene 152 may be also move away from the eyes of the user 101. In some examples, the user 101 may control movements of the portal 132 to view different portions and objects of the scene 152. For example, the user 101 may pan the portal 132 to rotate the portal 132 horizontally in order to view different portions of the model that includes the scene 152.

In an example, prior to the display of the portal 132, the user 101 may hold the motion controller 112 at a physical position 113. Upon a display of the portal 132 by the virtual reality display device 111, the user 101 may perform a motion 102 to move the motion controller 112 from the position 113 to a new physical position 115 in order to move the displayed portal 132. In some examples, the sensors 113 may detect the motion 102 and may send information representing the motion 102 to the virtual reality console 110. In some examples, the sensors within the motion controller 112 may detect the motion 102 and may send information representing the motion 102 to the virtual reality console 110. The portal module 130 may apply the portal instructions 124 on the information to determine a new position and/or orientation of the portal 132 displayed by the virtual reality display device 111. For example, the portal instructions 124 may indicate that an upward motion should move the portal 132 towards to the eyes of the user 101. If the motion 102 is a upward motion, based on the portal instructions 124, the portal module 130 may generate a set of image frames, where the set of image frames may be rendered (such as by the processor 120) sequentially, and at time intervals that may be specified by the portal instructions 124, on the virtual reality display device 111 to simulate an effect of moving the portal 132 towards to the eyes of the user 101.

As the portal 132 moves toward to the eyes of the user, the scene 152 within the portal may also move towards the eyes of the user. The virtual reality console 110 may continue to send image frames to the virtual reality display device 111 to imitate the portal 132 and the scene 152 moving towards the eyes of the user 101. The movement of the portal 132 and the scene 152 may continue until the scene 152 replaces the scene 151 on the virtual reality display device 111, where the portal 132 may be removed upon the replacement of the scene 151 with the scene 152. As such, a scene transition may be performed by the user 101 performing the motion 102 with the motion controller 112 to move the portal 132 towards the eyes of the user 101, wherein movement of the portal brings the scene 152 towards the eyes of the user 101.

Figure 2:
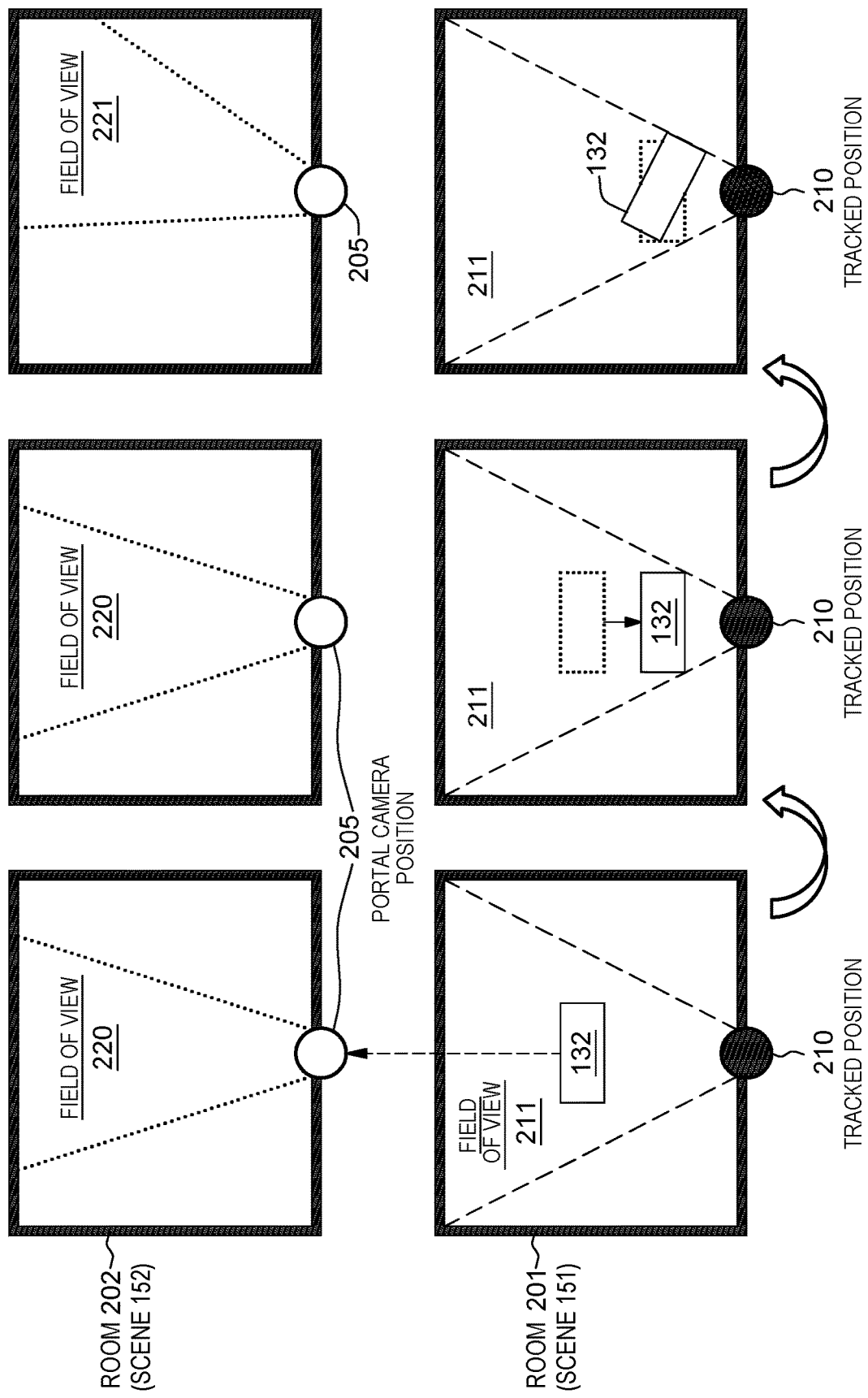
FIG. 2 illustrates the example system of FIG. 1 with additional details relating to motion-controlled portals in virtual reality in one embodiment of the present disclosure.

FIG. 2 illustrates the example system of FIG. 1 with additional details relating to a motion-controlled portals in virtual reality, arranged in accordance with at least some embodiments described herein. FIG. 2 may be described below with references to the above descriptions of FIG. 1.

In an example shown in FIG. 2, the application 115 may include a model for a room 201 (corresponding to the scene 151), and may include a model for a room 202 (corresponding to the scene 152. The sensors within the virtual reality display device 111 may track a physical location of the user 101 (which may be a same location as the physical location of the virtual reality display device 111) and may send the tracked information to the virtual reality console 110. The processor 120 may project the physical location of the user 101 as a tracked position 210 relative to the room 201 when the user 101 is viewing the scene 151. As shown in FIG. 2, when the user 101 is viewing the scene 151, a field of view 211 of the user 101 from the tracked position 210 may include the scene 151 showing a portion of the room 201.

The user 101 may request to transition into the scene 152, which corresponds to the room 202. The processor 120 may generate the portal 132 in response to the request by the user 101. To generate the portal 132, the portal module 130 may execute the portal camera script in the portal instructions 124 to project a portal camera at a portal camera position 205 in the room 202. The portal camera position 205 may define a perspective of the portal camera in order to simulate a perspective of the user 101 when the user 101 views the scene 152 from the portal 132. In other words, a field of view of the user 101 viewing the room 202 through the portal 132 may be the same as a field of view of the user viewing the room 202 if the physical location of the user 101 is projected as the portal camera position 205 relative to room 202.

Upon display of the portal 132 and the scene 152 within the portal 132, the portal 132 may overlay a portion of the scene 151 when the user 101 is viewing the scene 151 at the tracked position 210. The user 101 may continue to view the room 201 with field of view 211, and may also view portal 132, and a field of view 220, where the field of view 220 may include the scene 152 showing a portion of room 152.

The user 101 may move the motion controller 112 to reposition, or to move, the portal 132. For example, movement of the motion controller 112 over a head of the user 101 may cause the portal 132 to move towards the tracked position 210. In some examples, the field of view 220 may remain unchanged during a linear movement of the portal 132 towards the tracked position 210. The movement of the portal 132 with the scene 151, or the room 201, may include translating the position, or modifying a location, of the portal 132 within the room 201 to a new position at a plurality of time intervals. In some examples, the translation of the portal position may be performed by the processor 120 using matrix transformation techniques defined in the portal instructions 124. The portal camera position 205 relative to the room 202 remains unchanged during the translation of the portal position in room 201 in order to maintain the field of view 220 shown within the portal 132. Further, at each time where the portal position is translated, the processor 120 may render a new image frame on the virtual reality display device 111 to display a larger version of portal 132 and a larger version of scene 152 to imitate the portal 132 and the scene 152 moving towards the eyes of the user 101.

The user 101 may continue to move the portal 132 towards the tracked position 210, until the portal 132 reaches the tracked position 210. When the portal 132 reaches the tracked position 210, the user 101 may view the field of view 220, from the perspective of the portal camera position 205, instead of the field of view 211. As such, the room 201 may no longer be visible to user 101, and the scene 152 may replace the scene 151 on the screen of the virtual reality display device 111. In an example, the portal 132 may be removed and no longer visible to the user 101 upon the replacement of the scene 151 with the scene 152. In another example, upon the portal 132 reaching the tracked position 210, the virtual reality console 110 may render the first scene 151 in the portal 132 such that the user 101 may perform a motion with the motion controller 112 to bring the portal 132 into view, and look back into the first scene 151 through the portal 132.

By allowing the user 101 to move the motion controller 112 to control movements of the portal 132, the user 101 may visually perceive movement of the portal, instead of movement of the user 101, while the user 101 remains stationary and may not experience different motion cues. Thus, motion sickness may be avoided by implementing the system 100 to allow the user 101 to control the portal 132.

In another example, the user 101 may pan the motion controller 112 in physical space to pan the portal 132 in order to obtain a different field of view 221 through the portal 132. The sensors 113 and/or the motion controller 112 may detect the panning of the motion controller 112, and may send the detected panning information to the virtual reality console 110. The processor 120 may receive the detected panning information and may render a new stereoscopic image showing the field of view 221. The field of view 221 may be a different perspective of the scene 152, or room 202, from the perspective of the field of view 220. By allowing the user 101 to rotate and pan the portal 132 using the motion controller 112, the user 101 may view different portions of the room 202 through portal 132. In some examples, the user 101 may use the motion controller 112 to control other movements of the portal 132, such as tilting and rotating the portal 132, and/or other movements of portal 132.

Figure 3:
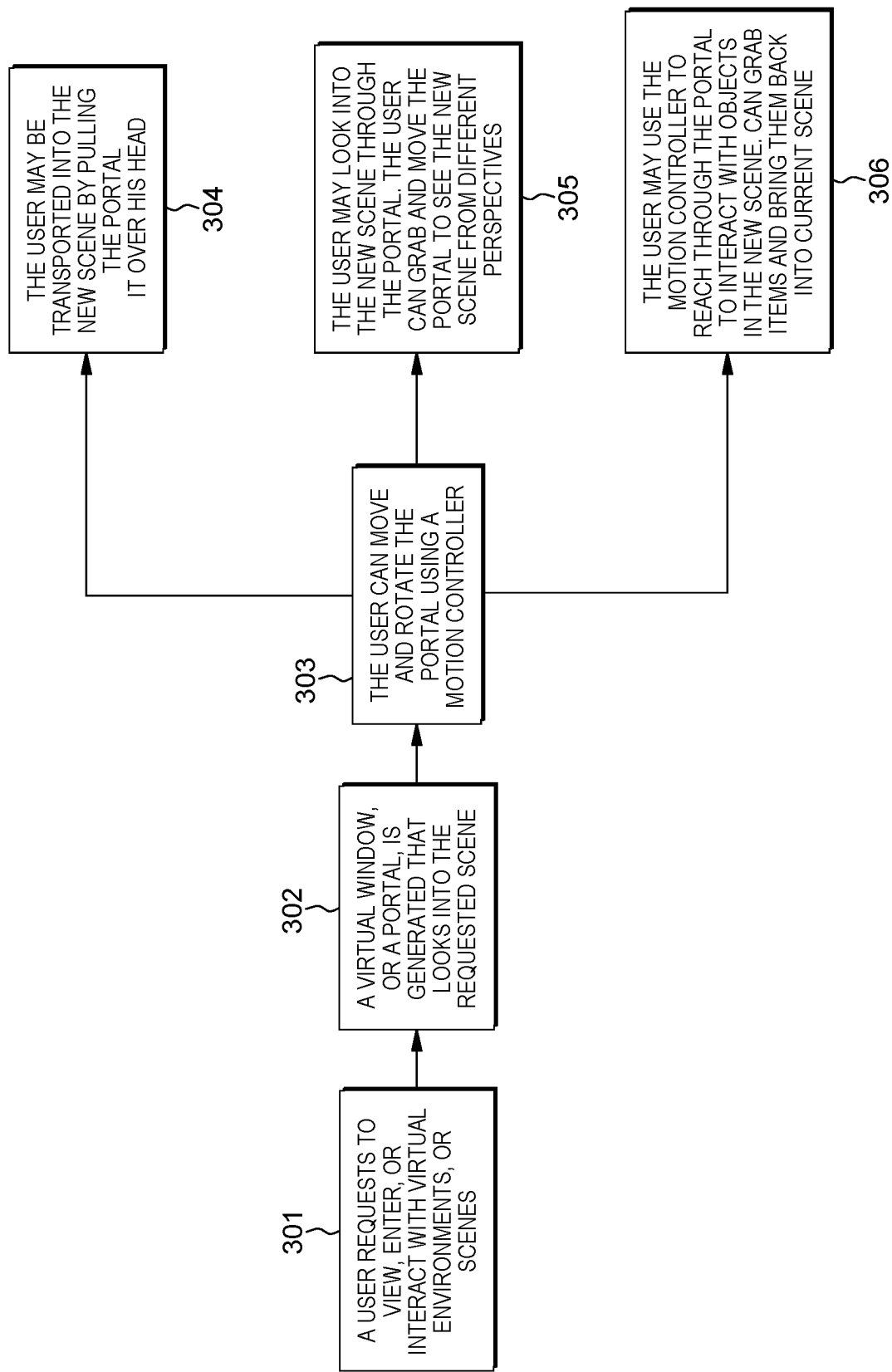
FIG. 3 illustrates a flow diagram relating to motion-controlled portals in virtual reality in one embodiment of the present disclosure.

FIG. 3 illustrates a flow diagram relating to motion-controlled portals in virtual reality, arranged in accordance with at least some embodiments presented herein. The process in FIG. 3 may be implemented using, for example, computer system 100 discussed above. An example process may include one or more operations, actions, or functions as illustrated by one or more of blocks 301, 302, 303, 304, 305, and/or 306. Although illustrated as discrete blocks, various blocks may be divided into additional blocks, combined into fewer blocks, eliminated, or performed in parallel, depending on the desired implementation.

At block 301, a user of a virtual reality system may request to view, enter, or interact with a new scene. In some examples, at the time of the request, the user may be viewing an old scene on a virtual reality display device. In some examples, at the time of the request, the user may be viewing a menu page of a virtual reality application and the request may be a request to review a plurality of new scenes available from the virtual reality application. In some examples, the request may be a request to virtually obtain a virtual object from the requested new scene.

The process may continue from block 301 to block 302. At block 302, the system 100 may generate a virtual window, or a portal, to allow the user to look into the requested new scene. The portal may be displayed on the virtual reality display device to overlay a portion of a scene being viewed by the user on the virtual reality display device. The requested scene may be displayed within a set of boundaries of the portal.

The process may continue from block 302 to block 303. At block 303, the user may control movements of the displayed portal using a motion controller. For example, the user may rotate the portal, move the portal up, down, left, right, away from the user, towards the user, and/or other movements. The user may move the motion controller in the physical space, or may use the mechanisms of the motion controllers, such as buttons and joysticks, to control movements of the portal. By controlling the portal with the motion controller, the user may perform one or more operations at blocks 304, 305, and 306.

At block 304, the user may enter the new scene by moving the motion controller over the head of the user to imitate a motion to pull the portal over the head of the user. In some examples, the system 100 may include instructions to map movements of the motion controller to movements of the portal. For example, a motion to pull the motion controller over the head of the user is mapped to a movement of the portal to towards the eyes of the user. As such, the portal may bring the new scene towards the eyes of the user without the user visually perceiving that the user is moving into the new scene.

At block 305, the user may preview different portions of the new scene through the portal. The user may move, such as pan or rotate, the motion controller to mimic panning and rotating the portal in order to obtain different views of the new scene.

At block 306, the user may use the motion controller to interact with virtual objects from the new scene through the portal. For example, the user may use the motion controller to reposition, or move, the virtual objects in the new scene within the portal. In another example, the user may use pull the motion controller towards the user to mimic the motion of physically capturing the virtual object from the new scene shown in the portal, in order to bring the virtual object outside of the portal into a scene that the user may be currently viewing.

In an example, the system 100 may be implemented for the user to preview a plurality of scenes through the portal before selecting a scene to enter.

In another example, the system 100 may be implemented with virtual reality training applications to train medical professionals in situations such as surgical procedures. The trainee may view a selection of virtual tools through the portal and may directly capture a desired tool to bring the tool into a current scene, without a need to make selections through multiple prompts and menus that may appear in the virtual reality training application. As such, the trainees may setup one or more portals, where each portal may include a respective set of tools, in order to practice particular skills. The embodiment of allowing medical trainees to capture tools virtually may provide a relative realistic training environment for the medical trainees, instead of navigating a user interface menu to select texts for obtaining tools during simulations of surgical procedures.

Figure 4:
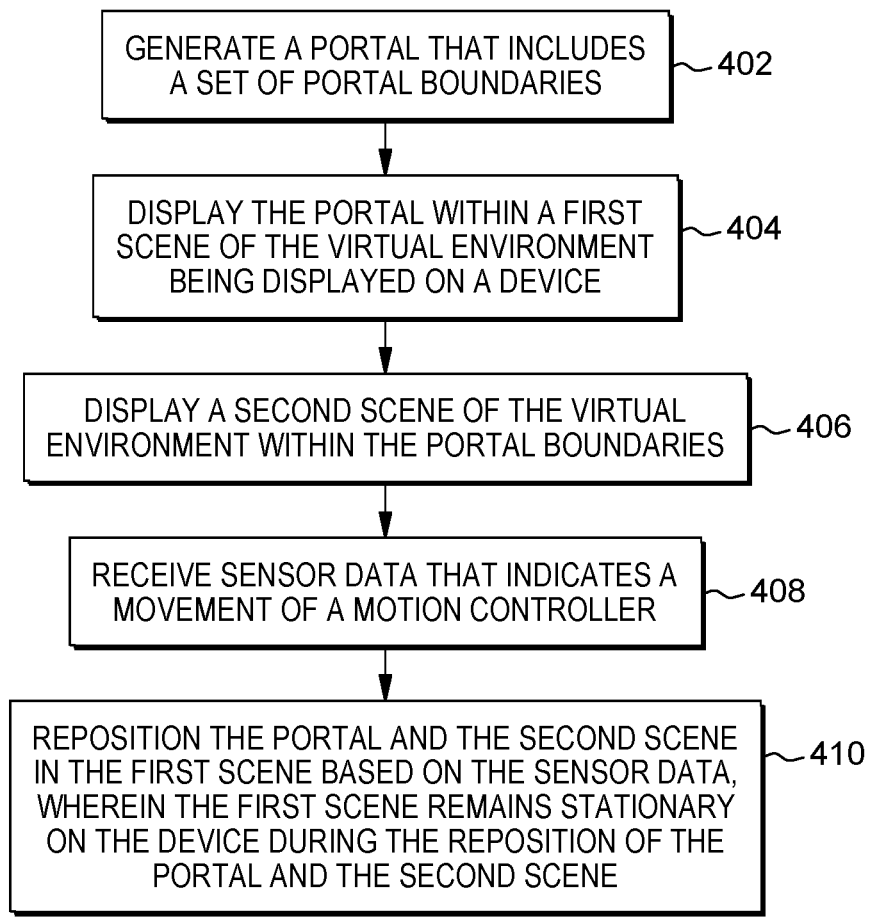
FIG. 4 illustrates a flow diagram relating to motion-controlled portals in virtual reality in one embodiment of the present disclosure.

FIG. 4 illustrates a flow diagram relating to motion-controlled portals in virtual reality, arranged in accordance with at least some embodiments presented herein. The process in FIG. 4 may be implemented using, for example, computer system 100 discussed above. An example process may include one or more operations, actions, or functions as illustrated by one or more of blocks 402, 404, 406, 408, and/or 410. Although illustrated as discrete blocks, various blocks may be divided into additional blocks, combined into fewer blocks, eliminated, or performed in parallel, depending on the desired implementation.

Processing may begin at block 402, where a processor may generate a portal that includes a set of portal boundaries. In some examples, generation of the portal may include defining a portal camera within the virtual environment, and projecting a position of the portal camera relative to the second scene. The display of the second scene within the portal boundaries may be based on a perspective from the position of the portal camera relative to the second scene.

Processing may continue from block 402 to block 404. At block 404a, the processor may display the portal within a first scene of the virtual environment being displayed on a device. The device may be a virtual reality display device, such as a virtual reality head-mounted display, configured to display stereoscopic images.

Processing may continue from blocks 404 to block 406. At block 406a, the processor may display a second scene of the virtual environment within the portal boundaries.

Processing may continue from blocks 406 to block 408. At block 408, the processor may receive sensor data that indicates a movement of a motion controller that may be configured to be in communication with the processor.

Processing may continue from blocks 408 to block 410. At block 410a, the processor may reposition the portal and the second scene in the first scene based on the sensor data. The first scene may remain stationary on the device during the reposition of the portal and the second scene. Repositioning the portal and the second scene in the first scene may include translating a location of the portal within the first scene to move the portal towards a user of the device until the second scene replaces the first scene being displayed on the device. In some examples, the portal may no longer be displayed upon the replacement of the first scene by the second scene.

In some examples, the processor may further receive new sensor data that indicates a new movement of the motion controller, and may reposition a virtual object of the second scene displayed within the portal boundaries. Repositioning of the virtual object of the second scene may include moving the virtual object from the second scene within the portal to the first scene outside of the portal.

In some examples, the processor may further receive new sensor data that indicates a panning movement of the motion controller, and may display a different perspective of the second scene within the portal boundaries.

Figure 5:
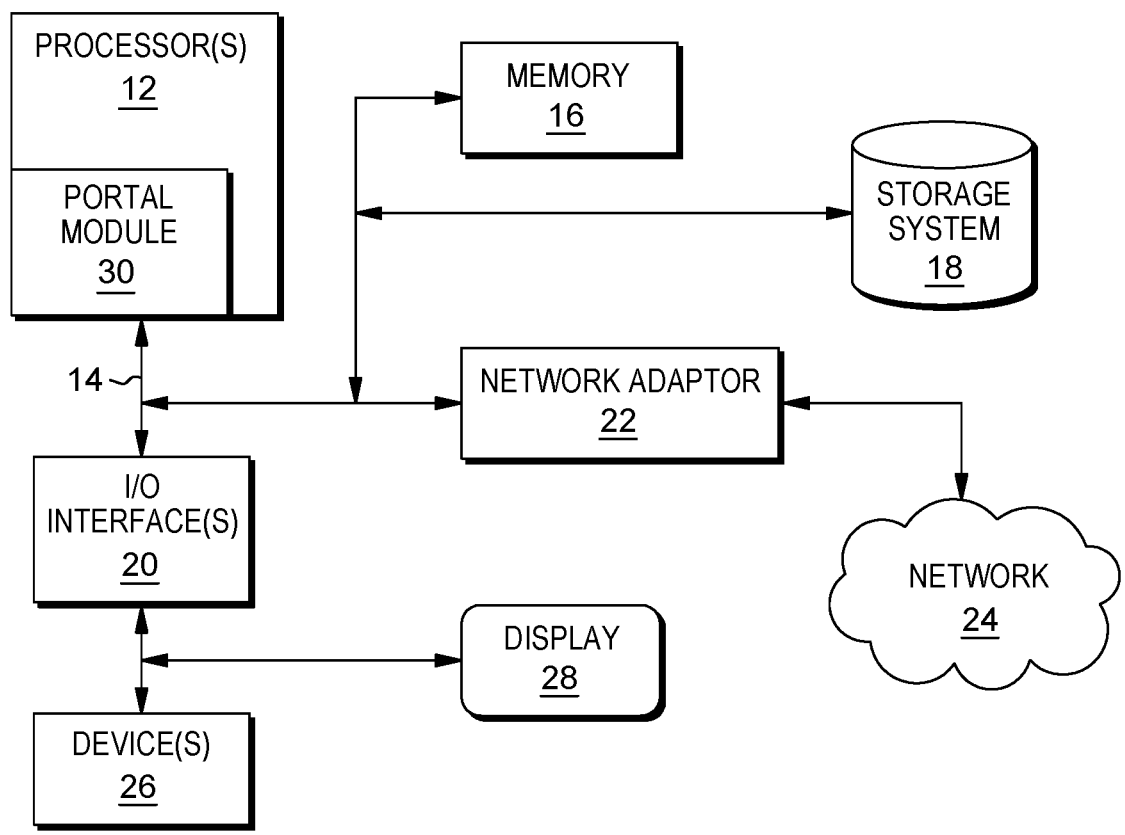
FIG. 5 illustrates a schematic of an example computer or processing system that may implement motion-controlled portals in virtual reality in one embodiment of the present disclosure.

FIG. 5 illustrates a schematic of an example computer or processing system that may implement motion-controlled portals for scene transitions in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 5 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., portal module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method of navigating within a virtual environment, the method comprising:
    generating, by a processor, a portal that includes a set of portal boundaries;
    displaying, by the processor, the portal within a first scene of the virtual environment being displayed on a device, wherein the first scene is a stereoscopic image including a first set of virtual objects tagged with an identification of the first scene, and displaying the portal comprises overlaying the portal on a virtual object among the first set of virtual objects;
    displaying, by the processor, a second scene of the virtual environment within the portal boundaries to display the second scene within the portal being displayed in the first scene, wherein the second scene is another stereoscopic image including a second set of virtual objects tagged with an identification of the second scene, and displaying the second scene comprises running a script to disable collisions between the first scene and the second scene of the virtual environment;
    receiving, by the processor, sensor data that indicates a movement of a motion controller configured to be in communication with the processor; and
    repositioning, by the processor, the portal and the second scene in the first scene based on the sensor data, wherein the display of the first scene remains stationary on the device during the repositioning of the portal and the second scene, and wherein repositioning the portal and the second scene in the first scene includes translating a location of the portal, and enlarging the portal, within the first scene to move the portal towards a user of the device.

2. The computer-implemented method of claim 1, further comprising continuing to translate the location of the portal until the second scene replaces the first scene being displayed on the device.

3. The computer-implemented method of claim 2, wherein the portal is no longer displayed upon the replacement of the first scene by the second scene.

4. The computer-implemented method of claim 1, wherein the sensor data is first sensor data, and the movement is a first movement, the method further comprising:
    receiving, by the processor, second sensor data that indicates a second movement of the motion controller; and
    repositioning, by the processor, a virtual object of the second scene displayed within the portal boundaries.

5. The computer-implemented method of claim 4, wherein repositioning the virtual object of the second scene includes moving the virtual object from the second scene within the portal boundaries to a portion of the first scene that is outside of the portal boundaries.

6. The computer-implemented method of claim 1, wherein generating the portal includes:
    defining, by the processor, a portal camera within the virtual environment; and
    projecting, by the processor, a position of the portal camera relative to the second scene, wherein the display of the second scene within the portal boundaries is based on a perspective from the position of the portal camera relative to the second scene.

7. The computer-implemented method of claim 1, wherein the sensor data is first sensor data, and the movement is a first movement, the method further comprising:
    receiving, by the processor, second sensor data that indicates a panning movement of the motion controller; and
    displaying, by the processor, a different perspective of the second scene within the portal boundaries.

8. The method of claim 1, wherein repositioning the portal further comprises performing one or more of panning, tilting, and rotating, the portal to display different portions of the second scene within the set of boundaries of the portal being displayed in the first scene.

9. A system effective to facilitate navigation within a virtual environment, the system comprising:
    a memory configured to store a set of instructions;
    a motion controller;
    a sensor configured to detect motions related to the motion controller;
    a device configured to display images;
    a processor configured to be in communication with the memory, the sensor, and the device, the processor being configured to execute the set of instructions stored in the memory to:
        generate a portal that includes a set of portal boundaries;
        display the portal within a first scene of the virtual environment being displayed on the device, wherein the first scene is a stereoscopic image including a first set of virtual objects tagged with an identification of the first scene, and displaying the portal comprises overlaying the portal on a virtual object among the first set of virtual objects;
        display a second scene of the virtual environment within the portal boundaries on the device to display the second scene within the portal being displayed in the first scene, wherein the second scene is another stereoscopic image including a second set of virtual objects tagged with an identification of the second scene, and displaying the second scene comprises running a script to disable collisions between the first scene and the second scene of the virtual environment;
        receive sensor data from the sensor, wherein the sensor data indicates a movement of a motion controller; and
        reposition the portal and the second scene in the first scene based on the sensor data, wherein the display of the first scene remains stationary on the device during the reposition of the portal and the second scene, and wherein the reposition of the portal and the second scene in the first scene includes translating a location of the portal, and enlarging the portal, within the first scene to move the portal towards a user of the device.

10. The system of claim 9, wherein the device is a virtual reality display device configured to display stereoscopic images.

11. The system of claim 9, wherein the processor is further configured to continue the translation of the location of the portal until the second scene replaces the first scene being displayed on the device.

12. The system of claim 11, wherein the portal is no longer displayed upon the replacement of the first scene by the second scene.

13. The system of claim 9, wherein the sensor data is first sensor data, and the movement is a first movement, the processor is further configured to:
- receive second sensor data from the sensor, where the second sensor data indicates a second movement of the motion controller; and
- reposition a virtual object of the second scene displayed within the portal boundaries.

14. The system of claim 9, wherein the processor is further configured to:
- define a portal camera within the virtual environment; and
- project a position of the portal camera relative to the second scene, wherein the display of the second scene within the portal boundaries is based on a perspective from the position of the portal camera relative to the second scene.

15. A computer program product for navigating within a virtual environment, the computer program product comprising a computer readable storage medium having program instructions embodied therewith, the program instructions executable by a processor to cause the processor to:
- generate a portal that includes a set of portal boundaries;
- display the portal within a first scene of the virtual environment being displayed on a device, wherein the first scene is a stereoscopic image including a first set of virtual objects tagged with an identification of the first scene, and displaying the portal comprises overlaying the portal on a virtual object among the first set of virtual objects;
- display a second scene of the virtual environment within the portal boundaries to display the second scene within the portal being displayed in the first scene, wherein the second scene is another stereoscopic image including a second set of virtual objects tagged with an identification of the second scene, and displaying the second scene comprises running a script to disable collisions between the first scene and the second scene of the virtual environment;
- receive sensor data that indicates a movement of a motion controller configured to be in communication with the processor; and
- reposition the portal and the second scene in the first scene based on the sensor data, wherein the display of the first scene remains stationary on the device during the reposition of the portal and the second scene, and wherein the reposition of the portal and the second scene in the first scene includes translating a location of the portal, and enlarging the portal, within the first scene to move the portal towards a user of the device.

16. The computer program product of claim 15, wherein the program instructions are further executable by the processor to cause the processor to continue the translation of the location of the portal until the second scene replaces the first scene being displayed on the device, and wherein the portal is no longer displayed upon the replacement of the first scene by the second scene.

17. The computer program product of claim 15, wherein the sensor data is first sensor data, and the movement is a first movement, and wherein the program instructions are further executable by the processor to cause the processor to:
- receive second sensor data that indicates a second movement of the motion controller; and
- reposition a virtual object of the second scene displayed within the portal boundaries.

18. The computer program product of claim 15, wherein the program instructions are further executable by the processor to cause the processor to:
- define a portal camera within the virtual environment; and
- project a position of the portal camera relative to the second scene, wherein the display of the second scene within the portal boundaries is based on a perspective from the position of the portal camera relative to the second scene.

* * * * *